US008041570B2

(12) United States Patent
Mirkovic et al.

(10) Patent No.: US 8,041,570 B2
(45) Date of Patent: Oct. 18, 2011

(54) DIALOGUE MANAGEMENT USING SCRIPTS

(75) Inventors: Danilo Mirkovic, Palo Alto, CA (US); Lawrence Cavedon, Palo Alto, CA (US)

(73) Assignee: Robert Bosch Corporation, Broadview, IL (US)

(*) Notice: Subject to any disclaimer, the term of this patent is extended or adjusted under 35 U.S.C. 154(b) by 704 days.

(21) Appl. No.: 11/142,196

(22) Filed: May 31, 2005

(65) Prior Publication Data

US 2006/0271351 A1 Nov. 30, 2006

(51) Int. Cl.
*G10L 21/00* (2006.01)

(52) U.S. Cl. ............ 704/270; 704/9; 704/235; 704/239; 704/257; 704/275; 704/E15.04

(58) Field of Classification Search .................. 704/270, 704/275, E15.04, 9, 235, 239, 257
See application file for complete search history.

(56) References Cited

U.S. PATENT DOCUMENTS

| | | | |
|---|---|---|---|
| 6,216,120 B1 * | 4/2001 | Ueno et al. | 706/47 |
| 6,311,159 B1 * | 10/2001 | Van Tichelen et al. | 704/275 |
| 6,434,524 B1 | 8/2002 | Weber | |
| 6,941,558 B2 * | 9/2005 | Hill et al. | 719/321 |
| 6,973,625 B1 * | 12/2005 | Lupo et al. | 715/762 |
| 7,184,960 B2 * | 2/2007 | Deisher et al. | 704/275 |
| 7,257,537 B2 * | 8/2007 | Ross et al. | 704/270 |
| 7,260,530 B2 * | 8/2007 | Werner | 704/251 |
| 7,353,176 B1 * | 4/2008 | Baray et al. | 704/275 |
| 7,552,055 B2 * | 6/2009 | Lecoeuche | 704/270.1 |
| 7,761,480 B2 * | 7/2010 | Toledano et al. | 707/804 |
| 2001/0041980 A1 | 11/2001 | Howard et al. | |
| 2002/0010588 A1 * | 1/2002 | Fujimori | 704/275 |
| 2002/0059069 A1 * | 5/2002 | Hsu et al. | 704/257 |
| 2002/0095286 A1 | 7/2002 | Ross et al. | |
| 2002/0198719 A1 * | 12/2002 | Gergic et al. | 704/270.1 |
| 2003/0004727 A1 * | 1/2003 | Keiller | 704/275 |
| 2004/0002866 A1 * | 1/2004 | Deisher et al. | 704/275 |
| 2004/0083092 A1 * | 4/2004 | Valles | 704/9 |
| 2005/0010393 A1 * | 1/2005 | Danieli et al. | 704/9 |

(Continued)

FOREIGN PATENT DOCUMENTS

EP 0 911 808 A1 4/1999

OTHER PUBLICATIONS

Rapp, Stefan, Sunna Torge, Silke Goronzy & Ralf Kompe (2000). Dynamic speech interfaces. In Proceedings of the ECAI 2000 Workshop on Artificial Intelligence in Mobile Systems, p. to appear.*

(Continued)

*Primary Examiner* — Richemond Dorvil
*Assistant Examiner* — Greg Borsetti
(74) *Attorney, Agent, or Firm* — Dergosits & Noah LLP; Geoffrey T. Staniford (57) ABSTRACT

Representation-neutral dialogue systems and methods ("RNDS") are described that include multi-application, multi-device spoken-language dialogue systems based on the information-state update approach. The RNDS includes representation-neutral core components of a dialogue system that provide scripted domain-specific extensions to routines such as dialogue move modeling and reference resolution, easy substitution of specific semantic representations and associated routines, and clean interfaces to external components for language-understanding (i.e., speech-recognition and parsing) and language-generation, and to domain-specific knowledge sources. The RNDS also allows seamless interaction with a community of devices.

28 Claims, 8 Drawing Sheets

U.S. PATENT DOCUMENTS

2005/0033582 A1* 2/2005 Gadd et al. .................. 704/277
2005/0234726 A1* 10/2005 Torge et al. ................ 704/270.1
2006/0074670 A1* 4/2006 Weng et al. .................. 704/257

OTHER PUBLICATIONS

Montoro, G., Alamán, X., Haya, P.: A plug and play spoken dialogue interface for smart environments. In Proceedings of CICLing'04. LNCS, vol. 2945 (2004).*

Pakucs, B, "Butler: A Universal Speech Interface for Mobile Environments", in Lecture Notes in Computer Science 3160 Springer-Verlag, Sep. 2004, 399-403.*

Danilo Mirkovic, et al., Practical Plug-And Play Dialogue Management, CSLI, Staniford University, 8 pgs. 2005.*

Manny Rayner, et al., Plug and Play Speech Understanding, netdecisions Ltd, 10 pgs. 2001.*

Fulian Weng, et al., A Conversational Dialogue System for Cognitively Overloaded Users, Research and Technology Center, 4 pgs. Oct. 4-8, 2004.*

Alexander Gruenstein and Lawrence Cavedon. Using an activity model to address issues in task-oriented dialogue interaction over extended periods. In Proceedings of AAAI Spring Symposium on Interaction Between Humans and Autonomous Systems over Extended Periods, Mar. 2004.*

S. Seneff, E. Hurley, R. Lau, C. Pao, P. Schmid, and V. Zue, "Galaxy—II: A reference architecture for conversational system development," in Proc. ICSLP, 1998, pp. 931-934.*

Allen, J., Byron, D., Dzikovska, M., Ferguson, G., Galescu, L., & Stent, A. (2001). Towards conversational human-computer interaction. AI Magazine, 22, 27{37.*

Alexander Gruenstein. Conversational interfaces: A domain-independent architecture for task-oriented dialogues. Master's thesis, Stanford University, Dec. 2002.*

Pakucs. "SesaME: A Framework for Personalised and Adaptive Speech Interfaces" Apr. 2003.*

B. Pakucs. 2002. VoiceXML-based dynamic plug and play dialogue management for mobileenvironments. ISCA T&R Workshop on Multi-Modal Dialogue in Mobile Environments, Kloster Irsee, Germany.*

B. Pakucs. 2003. Towards dynamic multi-domain dialogue processing. EUROSPEECH: 8th European Conference on Speech Communication and Technology, Geneva.*

Filipe et al. "Towards Ubiquitous Task Management" Oct. 4-8, 2004.*

Lemon et al. "Multi-tasking and Collaborative Activities in Dialogue Systems" 2002.*

Gabsdil et al. "Combining Acoustic and Pragmatic Features to Predict Recognition Performance in Spoken Dialogue Systems" 2004.*

Lemon et al. "Multithreaded Context for Robust Conversational Interfaces: Context-Sensitive Speech Recognition and Interpretation of Corrective Fragments" Sep. 2004.*

Rayner et al. "A Compact Architecture for Dialogue Management Based on Scripts and Meta-Outputs" 2000.*

Dzikovska. "A Practical Semantic Representation for Natural Language Parsing" 2004.*

Rayner et al. "Turning Speech Into Scripts" 2000.*

Elting et al. "Architecture and Implementation of Multimodal Plug and Play" 2003.*

Wahlster. "SmartKom: Symmetric Multimodality in an Adaptive and Reusable Dialogue Shell" 2003.*

Bos et al. "DIPPER: Description and Formalisation of an Information-State Update Dialogue System Architecture" 2003.*

* cited by examiner

```
Types {
    Playable;
    ...
}
Slots {
    Playable playable-object;
    ...
}
// Task definitions
taskdef<play, "play"> {
    DefinableSlots {
        required Playable playable-object;
        optional . . .   // optional arguments (e.g. volume)
    }
    ...
}
```

```
User Commands: play {
    // inherits from generic Command dialogue move
    Description "play something"
    Input {
            // "play/start X"
        "s ( features (mood (imperative ) )
            predicate (#play/vb| #start/vb) ,
                ? arglist (obj :_,?sbj :* ) ) "
            // " I want to play/hear X "
        "s ( features (mood (indirect) ) ,
            predicate (#play/vb| #hear/vb) ,
                ?arglist (obj:_ playable-object;,?sbj:*)) "
        // other templates ...
    }
    producing {    // Questions
        System WHQuestion: disambiguate
        System WHQuestion: fill :play:_ playable-object; {
            Output { avs "(el / play
                                    :question  (ql /what)
                                    :agent I) "
        }...}
        CloseOn System Report: play: playing {
            Output { avs " (el / play
                                    :patient (pl / [song] )
                                    :aspect continuous) "
            }
        ...}
...}
```

1. #song --> *Simple system:hasCategory : music:Song*
   "What songs do you have?"
2. #this/dt --> *MP3Specific this music:Song*
   "What's *this*?"
3. ncomp(#by/in,sbj:FRAME) --> *Frame music:songHasArtist|music:albumHasArtist*
   "Do you have anything *by X*?"
4. s(predicate(#called|#named),arglist(obj(#:WORD))) --> *Simple system:hasName*
   "Do you have a song *called/named X*?"
5. ncomp(#on/in|#in/in|#from/in,spj:Frame) --> *Frame music:hasSongList*
   "Play something *from an album by X*"

FIG.8

DIALOGUE MANAGEMENT USING SCRIPTS

TECHNICAL FIELD

The disclosure herein relates generally to dialogue management and, more particularly, to management of multi-application, multi-device spoken-language dialogue systems.

BACKGROUND

Dialog includes language of a conversation between participants as well as a shared central context constructed by the participants to a conversation (e.g., references later in a conversation to "it" refer to something described earlier in the conversation). The participants of the conversation may be human, machine, or any combination of humans and machines. Dialog Management includes interpretation of speaker utterances with respect to the shared context, as well as techniques and strategies for managing the interaction between the dialog participants. Activity-oriented dialogue systems have been in development for applications such as multimodal control of robotic devices, speech-enabled tutoring systems, and conversational interaction with in-car devices. The typical dialogue system architecture includes various components like speech-recognizers, language parsers, language generators, speech-synthesizers, and Dialogue Managers ("DM"). This dialogue system can also include connections to external application-specific components such as ontologies or knowledge bases ("KB"), as well as dialogue-enabled devices. See the following for examples of Dialog Systems: (i) Lemon, O., A. Gruenstein, S. Peters (2002), "Collaborative activities and multi-tasking in dialogue systems", Traitement Automatique des Langues (TAL), 43(2); (ii) Clark, B., J. Fry, M. Ginzton, S. Peters, H. Pon-Barry, Z. Thomsen-Grey (2001), "Automated tutoring dialogues for training in shipboard damage control", SIGdial; and (iii) Weng, F., L. Cavedon, B. Raghunathan, D. Mirkovic, H. Cheng, H. Schmidt, H, Bratt, R. Mishra, S. Peters, L. Zhao, S. Upson, L. Shriberg, C. Bergmann (2004), "A conversational dialogue system for cognitively overloaded users (poster)", INTERSPEECH.

The DM of a dialogue system is an oversight module that facilitates the interaction between dialogue participants. The dialogue system using Activity Models is specific to a type of dialogue, referred to as "activity-oriented dialogue", which is dialogue about activities being jointly) carried out by a user and a machine, computer, and/or robot. In a user- or speaker-initiated system, the DM directs the processing of an input utterance from one component to another through interpretation and back-end system response. In the process, the DM detects and handles information inputs of an input utterance, and generates system output, for example. The DM may be used with different parsers and language-generation components. Interaction with external devices is mediated by Activity Models ("AMs"), i.e. declarative specifications of device capabilities and their relationships to linguistic processes. However, customization to new domains has generally required some significant programming effort, due to variations in dialogue move requirements across applications, representation variation in interface to the language parser and other components, as well as certain processes (e.g. reference resolution) having domain-specific aspects to them.

The conventional dialogue management systems range from the commercially widely-used yet more constrained dialogue-modeling mechanisms based on voice extensible markup language ("VXML"), to semantic models based on the TrindiKit approach to information-state update. While many dialogue systems are designed and implemented for specific domains, these systems require significant engineering to apply to new domains. Conversely, a dialogue management infrastructure based on VXML allows flexible implementation of speech-based dialogue systems for new domains, but provides only shallow solutions to many issues in dialogue modeling.

INCORPORATION BY REFERENCE

Each publication and/or patent application mentioned in this specification is herein incorporated by reference in its entirety to the same extent as if each individual publication and/or patent application was specifically and individually indicated to be incorporated by reference.

In the drawings, the same reference numbers identify identical or substantially similar elements or acts. To easily identify the discussion of any particular element or act, the most significant digit or digits in a reference number refer to the Figure number in which that element is first introduced (e.g., element 100 is first introduced and discussed with respect to FIG. 1).

DETAILED DESCRIPTION

Representation-neutral dialogue systems and methods are described that include multi-application, multi-device spoken-language dialogue systems based on the information-state update approach. The representation-neutral dialogue systems and methods, collectively referred to herein as the Representation-Neutral Dialogue Systems ("RNDS"), include representation-neutral core components of a dialogue system that provide scripted domain-specific extensions to routines such as dialogue move modeling and reference resolution. The RNDS supports substitution of specific semantic representations and associated routines, and clean interfaces to external components for language-understanding (i.e., speech-recognition and parsing) and language-generation, and to domain-specific knowledge sources, thereby reducing or eliminating any requirement to recode any core software components. The RNDS also allows seamless interaction with a community of devices as described below.

Scripts of the RNDS, which include Dialogue Move Scripts ("DMS"), Activity Models, and Noun Phrase Resolution Scripts ("NPRS"), provide the capability for easy customization of the RNDS to new dialogue domains and applications. Further, the RNDS forms the basis of a "plug-and-play" dialogue management architecture in which device application programming interfaces ("APIs") encapsulate customized dialogue moves, activity models, and knowledge bases, as well as domain-specific extensions to core processes (such as reference resolution). This plug-and-play dialogue management enables multi-device dialogue management, allowing new dialogue-enabled devices to be dynamically added to an existing multi-device dialogue system.

The RNDS of an embodiment implements the information-state update approach to dialogue management through the use of the DMS. The DMS includes a combination of generic dialogue processes with an ability to easily extend or customize "dialogue moves", which handle dialogue contributions from the user, to a new domain. In particular, this forms the basis of multi-device dialogue management in the RNDS, where each device provides its own DMS ("device-specific DMS"), which include mappings from user utterances to device-specific dialogue moves. Other scripts of an embodiment (e.g., NPRS) allow customization of other dialogue processes, such as noun phrase-resolution ("NP-resolution") (i.e., mapping object-descriptions in natural language to actual objects in a database), as well as Activity Models, which provide descriptions of capabilities of the dialogue-enabled devices controlled by the dialogue system.

The RNDS scripts are combined with other information from the core dialogue management architecture (e.g., Activity Models ("AM")) to provide a plug-and-play capability in the RNDS. The plug-and-play RNDS of an embodiment allows new devices to be dialogue-enabled and registered dynamically with the DM without requiring the DM to be restarted or re-compiled. In the context of the automobile industry, for example, this allows new devices for the automobile to be sold as dialogue-enabled entities, with the new devices then be added into an existing dialogue system in a vehicle like a car or truck.

The RNDS of an embodiment also supports multi-device dialogue management by extending the existing dialogue-management infrastructure in DMs. The extended dialogue management under the RNDS extends the pertinent data structures so as to simultaneously manage multiple dialogue-enabled devices. The extended dialogue management also extends internal processes, such as NP-resolution, in a way that makes the extended processes appropriate to multi-device interaction. In particular, such processes may be dependent on the selected device, while the device-recognition itself uses NP-resolution.

The RNDS therefore provides a combination of powerful practical core dialogue management processes with easy scriptable definitions of domain-specific information, such as dialogue-moves and NP-resolution mappings. The RNDS thus allows easy customization of the DM to new domains and applications, and also provides the means for plug-and-play multi-device dialogue management. The RNDS also provides explicit multi-device dialogue management processes, extending the core dialogue management infrastructure for information-state update dialogue management so as to manage simultaneous interaction with multiple devices.

Of practical importance in the context of automobile applications, conversational dialogue with a vehicle requires interaction with many devices, and natural interaction requires seamless dialogue management with the different devices. Furthermore, as speech-based dialogue interaction with in-car devices becomes a reality, new devices, or devices with upgraded capabilities, are likely to come to market and be dialogue-enabled. The availability of these new or upgraded devices should not require owners of vehicles with built-in DMs to upgrade their systems. Consequently, the dynamic plug-and-play multi-device dialogue management of the RNDS is an essential component to realizing the addition of new dialogue-enabled devices, or enhancements to existing dialogue capabilities of devices within the conventional dialogue management infrastructure.

In the following description, numerous specific details are introduced to provide a thorough understanding of, and enabling description for, embodiments of the RNDS. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Figure 1:
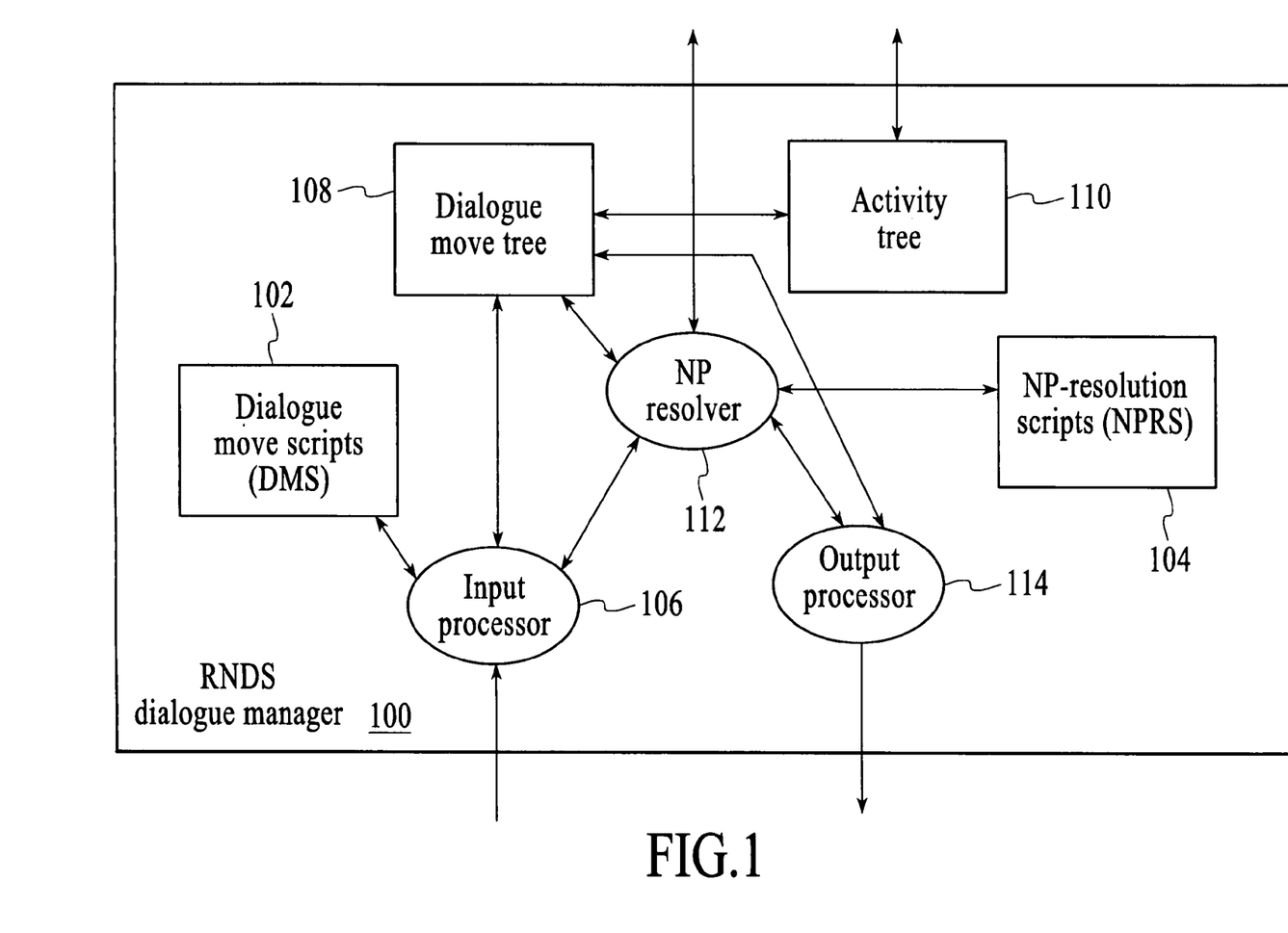
FIG. 1 is a block diagram of a representation-neutral dialogue system ("RNDS") Dialogue Manager ("DM") ("RNDS DM"), under an embodiment.

FIG. 1 is a block diagram of a representation-neutral dialogue system ("RNDS") Dialogue Manager ("DM") ("RNDS DM") 100, under an embodiment. The RNDS DM 100 comprises a number of systems or components and device-specific inputs, including but not limited to at least one of Dialogue Move Scripts ("DMS") 102, Noun Phrase-Resolution Scripts ("NPRS") 104, Activity Models, input processor 106, Dialogue Move Tree ("DMT") 108, Activity Tree ("AT") 110, noun phrase-resolver ("NP-resolver") 112, and output processor 114. The components 102-114 of the RNDS DM may be coupled in one or more combinations as appropriate to the embodiment of the system hosting the RNDS DM.

The RNDS DM 100 of the example embodiment includes an input processor 106 that receives inputs from one or more systems external to the RNDS DM. The input processor 106 is coupled to the DMS 102, DMT 108, and the NP-resolver 112. The NPRS 104 is coupled to the NP-resolver 112 but is not so limited. The DMT 108 of an embodiment is coupled to the AT 110. The NP-resolver 112 is also coupled to the DMT 108 and the output processor 114.

The DMS 102 and NPRS 104 of an embodiment function to recognize input commands to the RNDS DM 100 and to translate the command into a query in order to retrieve the object of the command. Specifically, the DMS 102 recognizes input commands (e.g., "play", or other commands like questions, etc.) along with parameters of the input command (e.g., name, description, etc. of an object, Play "X" for example) and, upon recognizing a received command, rules of the NPRS 104 translate the command or formulate a knowledge base or database query to retrieve the actual object of the command (the object "X" of the command "Play X") from a database (not shown). Translating the command/description into a particular query can be device specific because the same string of words may have two completely different meanings depending on the context of the device. The RNDS DM 100 therefore formulates a query that includes information of the type of object a user has requested (song), along with any specified constraints (e.g., name, artist, etc.).

Figure 2:
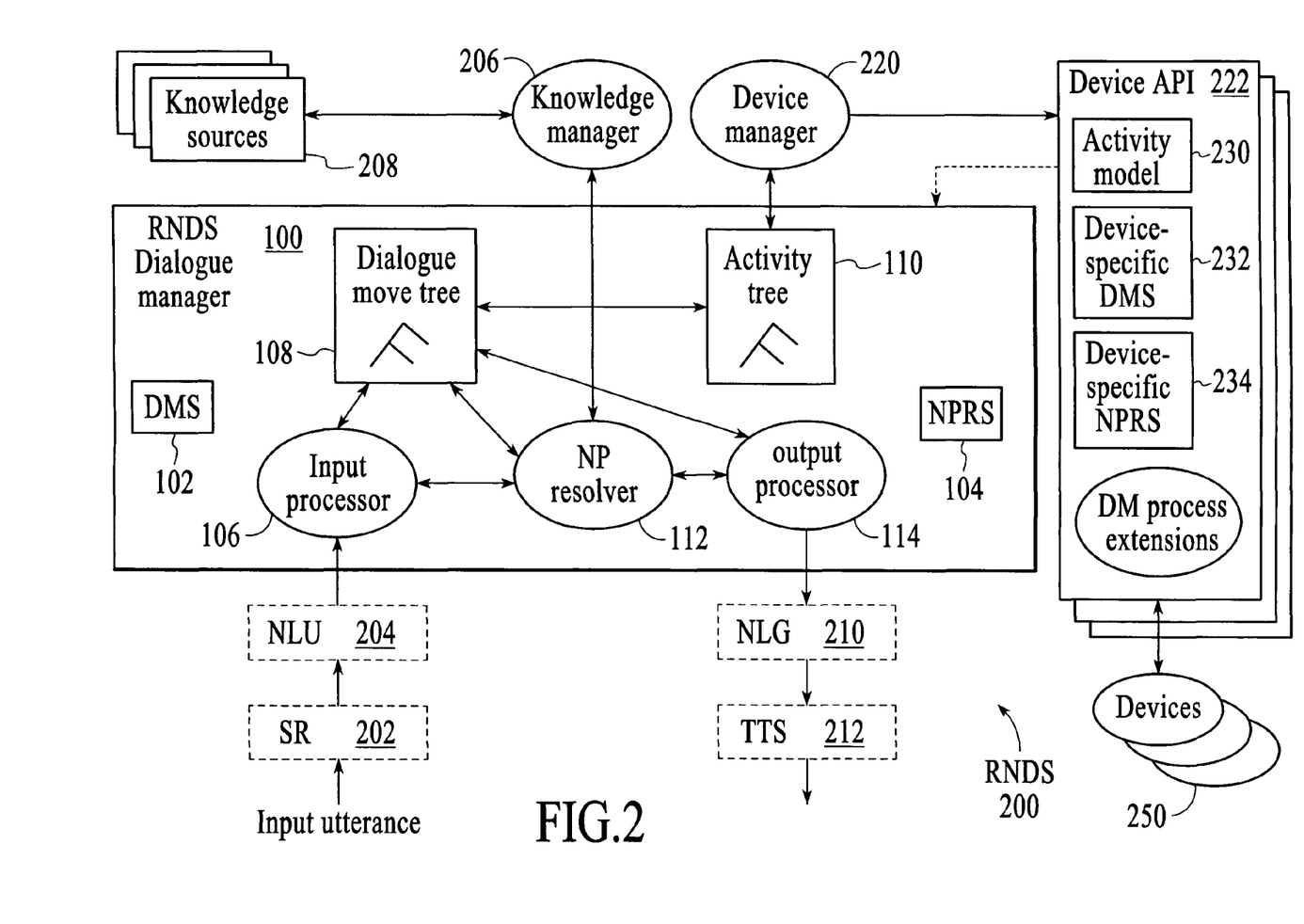
FIG. 2 is a block diagram of an RNDS, under an embodiment.

As an example of a dialogue system that includes the RNDS DM 100, FIG. 2 is a block diagram of a representation-neutral dialogue system ("RNDS") 200, under an embodiment. The RNDS 200 includes a RNDS DM 100 coupledd to one or more other components as appropriate to a configuration of the RNDS 200 and/or a system hosting or including the RNDS 200. The RNDS DM 100 includes the DMS 102 and NPRS 104 as described above with reference to FIG. 1 and elsewhere herein. In addition to the RNDS DM 100, the RNDS 200 of an embodiment includes one or more of a speech recognition ("SR") module or system 202, a language understanding module 204, a knowledge management module 206, knowledge sources 208, a language generation ("LG") module 210, and a text-to-speech ("TTS") module 212. The SR module 202 and TTS module 212 are included only in spoken dialog systems. The RNDS 200 may also include an application manager (not shown).

The SR module 202 receives acoustic signals at one or more inputs and outputs a sequence or a lattice of words with additional labels, such as confidence scores. The acoustic signals may come from a user (speaker) (e.g., user utterance). The language understanding module 204, also referred to as a natural language understanding ("NLU") module 204, is coupled to the SR module 202 and receives from the SR module 202 a sequence or a lattice of words with attached confidence at one or more inputs. The NLU module 204 outputs a structured meaning representation that may be based on statistical models trained on in-domain linguistic data and the available knowledge base. The RNDS DM 100 is coupled to the NLU module 204 and receives the structured meaning representations at one or more inputs. The RNDS DM 100 interprets the input representations in context, issuing appropriate instructions to other modules of the RNDS 200 based on the context and its knowledge base.

The knowledge management module 206, or "knowledge manager" ("KM") 206 as it is referred to herein, is coupled to the RNDS DM 100 and serves as a gateway to different knowledge sources or knowledge bases by managing the general ontology, the domain-specific ontology, and the database for any active domain. The RNDS DM 100 also updates and synchronizes the current knowledge base among different modules.

The LG module 210, also referred to as a natural language generator ("NLG") 210 is coupled to the output processor 114 of the RNDS DM 100, for example, and receives at one or more inputs the output from the RNDS DM 100. The LG module 210 organizes the received content in a succinct and grammatical way as appropriate to the TTS module 212. The TTS module 212 receives the organized content from the LG module 210 (e.g., word sequence with tagged features) and produces speech waveforms.

Components of the RNDS DM 100 also couple to one or more Devices 250 using a Device Manager 220 and one or more respective Device APIs 222. The Device Manager 220 of an embodiment couples the AT 110 of the RNDS DM 100 to the Device APIs 222 as appropriate to the number of Devices 250 of the RNDS 200 configuration. Each Device API 222 includes an AM 230, device-specific DMS 232, device-specific NPRS 234 (also referred to as NP-resolution grammar), and dialogue manager process extensions ("DM process extensions"), but is not so limited.

The DMS 102 and NPRS 104 of the RNDS DM 100 therefore enhance extensibility, customization, and reuse of the RNDS DM 100, as well as provide the basis of the multi-device plug-and-play RNDS 200. The DMS 102 and NPRS 104 allow the RNDS 200 to be customizable via scripting to new domains and applications. The scripting also allows for encapsulation of device information in support of the plug-and-play capability of the RNDS 200. Consequently, the RNDS DM 100 and RNDS 200 provide a framework in which new devices, or dialogue-capability for existing devices, can easily be added to a host system without disruption to an existing infrastructure. As one example, embodiments of the RNDS DM 100 and RNDS 200 may be components of a system for dialogue control of in-car electronic components, such as entertainment systems, navigation systems, and telematic devices, but the embodiments are not limited to vehicle systems.

Figure 3:
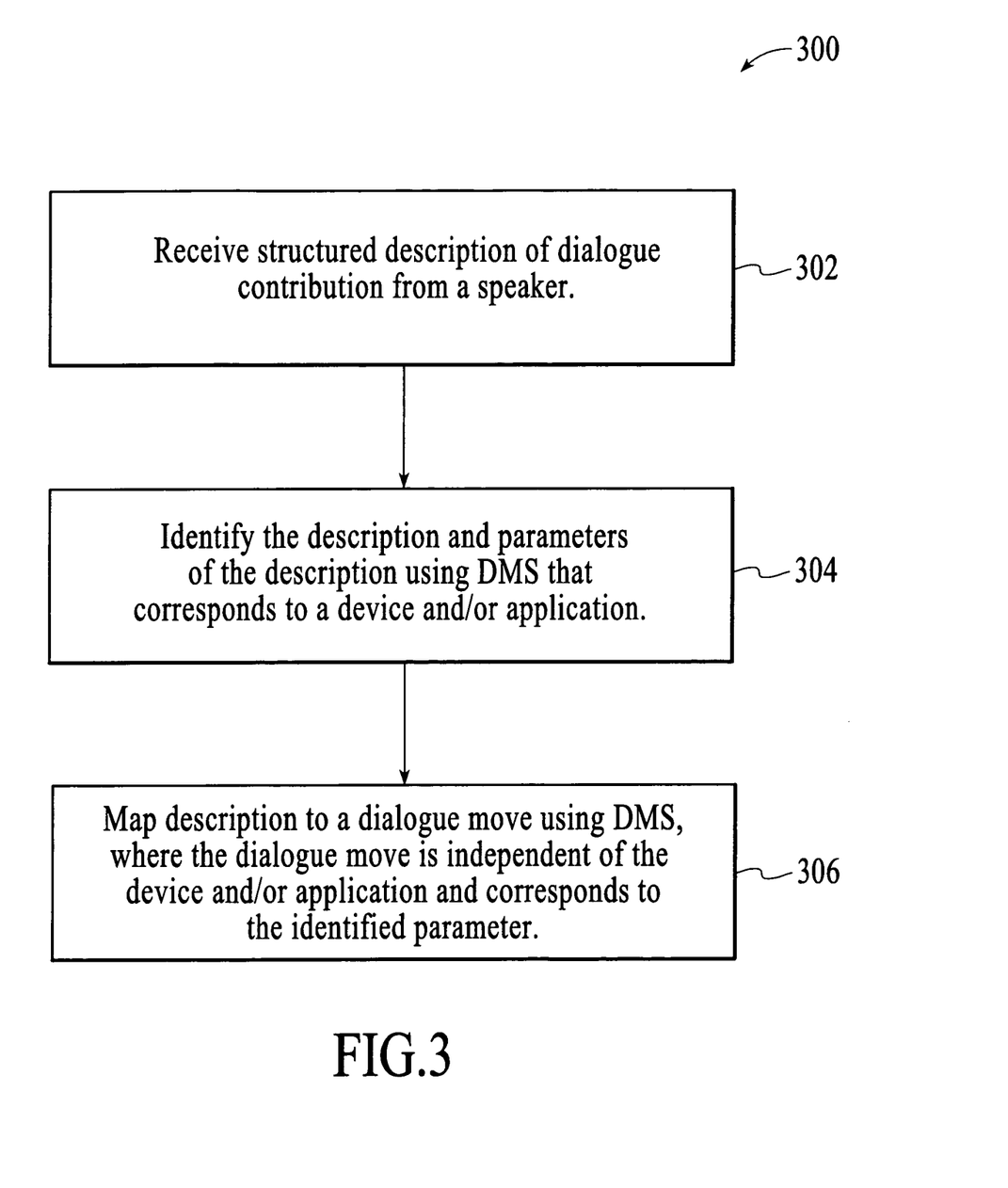
FIG. 3 is a flow diagram for mapping a description of a dialogue contribution to a dialogue move using a Dialogue Move Script ("DMS"), under an embodiment.

As one example involving operations of the DMS 102, FIG. 3 is a flow diagram for mapping 300 a description of a dialogue contribution to a dialogue move using a DMS, under an embodiment. The mapping 300 begins, following receipt of an acoustic signal from a speaker, with the receipt 302 of a structured description of a dialogue contribution from the speaker. This structure description may include one or more of syntactic, semantic, and phonological information, as well as utterance-wide information such as topic classification. A DMS is selected for use in identifying 304 the description and at least one parameter of the description. The DMS corresponds to at least one of a device and an application, but is not so limited. The DMS maps 306 the description to a dialogue move, where the dialogue move is independent of the device and application and corresponds to the recognized parameter. The dialogue moves are customizable or adaptable for use across numerous domains and/or applications via reprogramming of the DMS.

Figure 4:
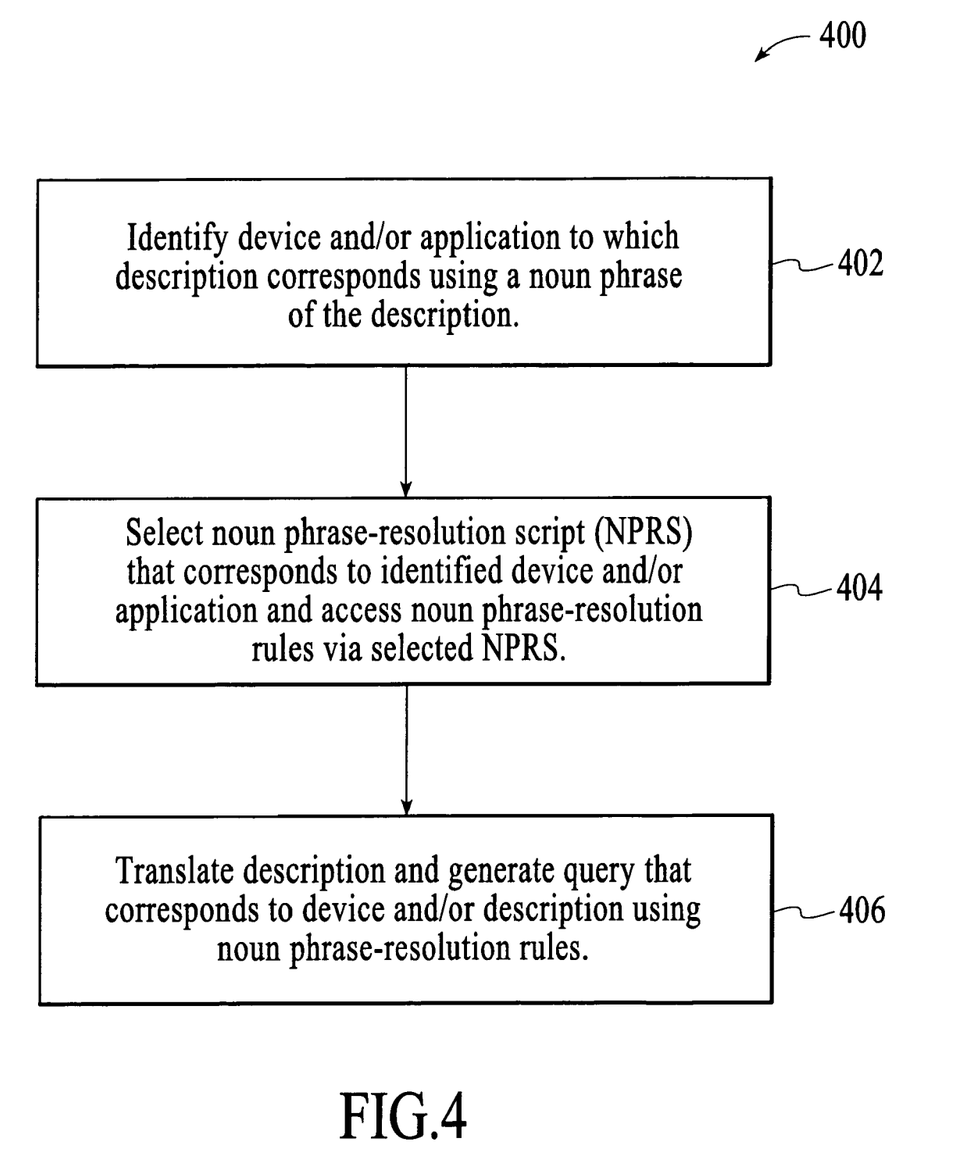
FIG. 4 is a flow diagram for using a noun phrase-resolution script ("NPRS") to generate a database query (noun phrase-query) that corresponds to a device, under an embodiment.

Turning to an example involving operations of the NPRS 104, FIG. 4 is a flow diagram for using an NPRS to generate a database query (noun phrase-query) that corresponds to a device, under an embodiment. Generation of the query begins by identifying 402 the device and/or application to which the description of a dialogue contribution from a speaker corresponds. The identification 402 uses a noun phrase of the description but is not so limited. A noun phrase-resolution script (NPRS) is selected 404 that corresponds to the identified device and/or application, and the NPRS is used to access noun phrase-resolution rules. The noun phrase resolution rules are used to translate 406 the description and generate a query that corresponds to the device and/or the description. The query once generated is provided to a database or knowledge base of the RNDS in order to retrieve an object (or multiple objects) corresponding to the dialogue contribution from the database.

Components of the RNDS DM 100 and/or the RNDS 200 may couple to other components not shown in the figures herein. While the term "components" is generally used herein, it is understood that "components" include circuitry, components, modules, and/or any combination of circuitry, components, and/or modules as the terms are known in the art. While various components shown herein may be depicted as co-located, the embodiment is not to be so limited; the RNDS DM 100 and/or RNDS 200 of various alternative embodiments may distribute one or more functions provided by any described component among any number and/or type of components, modules, and/or circuitry.

While one of each of the components comprising the RNDS DM 100 and/or RNDS 200 are shown, various alternative embodiments include any number and/or combination of each of these components coupled in various configurations known in the art. Further, while the components of the RNDS DM 100 and/or RNDS 200 are shown as separate blocks, some or all of these blocks can be monolithically integrated onto a single chip, distributed among a number of chips or components of a host system, and/or provided by some combination of algorithms. The term "processor" as generally used herein refers to any logic processing unit, such as one or more CPUs, digital signal processors ("DSP"), application-specific integrated circuits ("ASIC"), etc.

The actual configuration of the RNDS DM 100 and/or the RNDS 200 is as appropriate to the components, configuration, functionality, and/or form-factor of a host system; the couplings shown between components of the RNDS DM 100 and/or the RNDS 200 therefore are representative only and are not to limit the RNDS DM 100 and/or the RNDS 200 to the configuration shown. The RNDS DM 100 and/or the RNDS 200 can be implemented in any combination of software algorithm(s), firmware, and hardware running on one or more processors, where the software can be stored on any suitable computer-readable medium, such as microcode stored in a semiconductor chip, on a computer-readable disk, or downloaded from a server and stored locally at the host device for example.

The RNDS DM 100 and/or the RNDS 200 may couple among any combination of other components under program or algorithmic control, these other components including processors, memory devices, buses, controllers, input/output devices, communication systems, and displays to name a few. A coupled database may include any number, type, and/or combination of memory devices, including read-only memory ("ROM") and random access memory ("RAM"), but is not so limited.

The DMS 102 of the RNDS DM 100 facilitates use of the same Java code components across different devices (devices coupled to the inputs and outputs of the RNDS DM 100) because it allows different devices to use the Java components of the RNDS DM 100 according to the requirements of the particular device. Consequently, the DMS 102 is analogous to a programming language for writing dialog moves. The DMS 102 provides a way of efficiently adapting dialog moves for use across different domains or applications by adapting the Java code of a dialog move at a level higher than the actual Java code in order to use the dialog move across numerous devices. Therefore, any changes required to the RNDS DM 100 in order to process inputs from or outputs to particular devices can be accommodated via changes at the DMS 102 without requiring changes to the Java code of the core dialog moves. The DMS 102 thus allows dialog moves to be used in a new application or to command a new device without changes to the core Java code of the dialog move. The DMS 102 similarly allows for efficient generation of new applications for new devices as well.

The RNDS DM 100, with reference to FIGS. 1 and 2, can be used with different components for parsing, NL generation (NLG), etc. Embodiments of the RNDS DM 100 may use a rule-based head-driven parser (e.g., Gemini NLU system) with grammars tailored to the particular application domain, where the parser itself performs semantic normalization, returning semantic "logical forms" directly corresponding to the specific representations of device activities. Embodiments of the RNDS DM 100 may also use a third-party statistical parser, returning only weakly normalized semantic forms.

The RNDS DM 100 of an embodiment uses the information-state model or update approach (see Larsson, S. and D. Traum, 2000, "Information state and dialogue management in the TRINDI dialogue move engine toolkit", Natural Language Engineering, 6(3-4)) to maintain dialogue context. The "information-state model" is a modeling approach that models a context-dependent method of interpreting every contribution by participants to a conversation (objects and other knowledge introduced into the conversation by the participants make up the context). The information-state model builds a context based on things said before so that speakers are not required to express necessarily complete thoughts at a later point in a conversation. The dialogue context is then used to interpret incoming utterances (including fragments and revisions), resolve noun phrases ("NPs"), construct salient responses, track issues, etc. Dialogue state is also used to bias speech-recognizer expectation and improve SR performance (see Lemon, O. and A. Gruenstein, 2004, "Multi-threaded content for robust conversational interfaces: context-sensitive speech-recognition and interpretation of corrective fragments", Transactions on Computer-Human Interaction (ACM TOCHI), 11(3)).

The two central RNDS DM 100 components of the dialogue information state are the DMT 108 and the AT 110. The DMT 108 represents the historical context of a dialogue. Each dialogue contribution is classified as a "dialogue move" (e.g. "Command", "WhQuestion", "WhAnswer", etc.), and is interpreted in context by attaching itself to an appropriate "active" node on the DMT 108. For example, a "WhAnswer" attaches to an active corresponding "WhQuestion" node. The tree structure of the DMT 108 specifically supports multi-threaded, multi-topic conversations, where a new conversation topic spawns a new branch (see Lemon, O., A. Gruenstein, S. Peters (2002). "Collaborative activities and multi-tasking in dialogue systems", Traitement Automatique des Langues (TAL), 43(2)). A dialogue move that cannot attach itself to the most recent active node may attach to an active node in another branch (corresponding to a resumed conversation) or open a new branch by attaching itself to the root node (corresponding to a new conversation thread). The DMT 108 also serves as context for interpreting fragments, multi-utterance constructs, and revisions, and provides discourse structure for tasks such as NP-resolution.

The AT 110 manages activities relevant to a dialogue. When the user issues a command, this generally results in a new "activity" being created and added to the AT 110. Before the activity can actually be sent to the device for execution, the RNDS 200 attempts to fully "resolve" it, e.g. resolving all referring NPs or spawning a sub-dialogue to elicit further information. Revisions and corrections (e.g. "I meant/said . . . ") typically involve editing an existing activity representation. Activity-execution is monitored on the AT 110 and changes may result in a notification message being generated, e.g. on failure or successful completion of a task.

The AT 110 is coupled to AMs 230 of Devices 250 of the RNDS 200 via the Device Manager 220 and Device API 222, as described above. The AM 230, which encapsulates device-specific information, is a declarative specification of the capabilities of the agent or device with which the RNDS DM 100 interfaces, and includes linguistic information, such as mappings from predicate/argument structure to device-actions. Arguments that are marked as "required" may generate sub-dialogues when a user-command is given with missing arguments.

Figure 5:
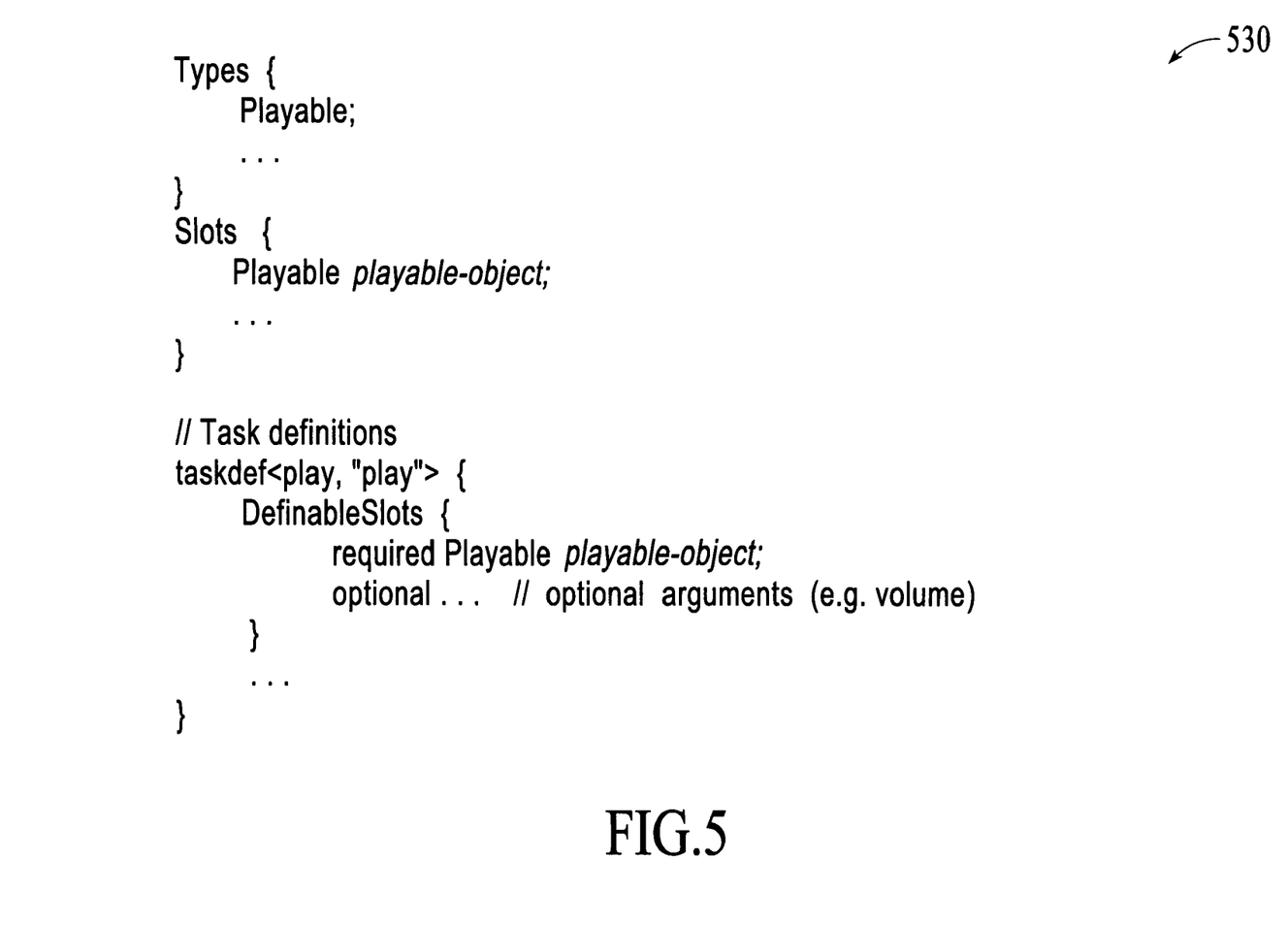
FIG. 5 is a portion of a sample Activity Model ("AM") for an MP3 device, under an embodiment.

The device-encapsulation approach, and in particular the dialogue move scripting language and NP-resolution rules described here, may be applied to an initial domain, controlling an MP3 music player and accessing a music database, for example. FIG. 5 is a portion of a sample Activity Model ("AM") 530 for an MP3 device, under an embodiment. The "required" argument position of this AM 530 includes "Playable", which corresponds to a class from the associated ontology of objects associated with this application; "playable-object" is a variable name filled by matching a dialogue move, as described below.

Dialogue managers may code dialogue moves completely programmatically (e.g. in Java); Dialogue managers also may include libraries of general-purpose dialogue moves (e.g. "Command", "WhQuestion", "WhAnswer", etc) corresponding to the types of dialogue contributions found in activity-oriented dialogues. As the dialogue manager was applied to new applications, new dialogue moves were implemented as appropriate to the applications, or existing dialogue moves refined to apply to the new application. Multiple applications were implemented in this way.

Customizing dialogue moves to new domains therefore typically required substantial coding or recoding. Further, using off-the-shelf parsers with wide-coverage grammars, or corpus-trained statistical parsers, required the dialogue manager to be able to handle new input semantic forms. The requirement of broad coverage dictated that the mapping from input to correct dialogue move be easily extensible. One approach to extending coverage is to normalize semantic information against broad language ontology (e.g. WordNet (see Miller, G. A., 1995, "WordNet: A lexical database for English", Comm. of the ACM 38)) or other knowledge base (see Dzikovska, M., 2004, "A Practical Semantic Representation for Natural Language Parsing", Ph.D. Thesis, University of Rochester). However, this still requires incoming forms to be mapped to the internal representation.

The dialogue-scripting language for writing the DMS 102 of an embodiment promotes re-use of dialogue moves, enhances extensibility, and copes with semantic variation across domains. The dialogue-scripting language of an embodiment defines hierarchical definitions of dialogue moves, allowing inheritance and re-use of existing dialogue moves, while allowing customization to a particular domain or device. The dialogue-scripting language of an embodiment also defines direct mappings of input semantic forms to appropriate dialogue moves. Further, the dialogue-scripting language provides attachment rules for information update. Additionally, the dialogue-scripting language provides other dialogue move-specific information, such as specification of output to be generated for disambiguation, requests for required information, to name a few.

The use of easily-extensible DMS 102 is consistent with using other approaches to achieve broad semantic coverage, such as use of an ontology or knowledge-base as mentioned above. However, it additionally provides a general approach for supplying application-specific information to the RNDS DM 100, for customizing it to new domains, as well as enabling the plug and play multi-device infrastructure of the RNDS 200 described herein.

Figure 6:
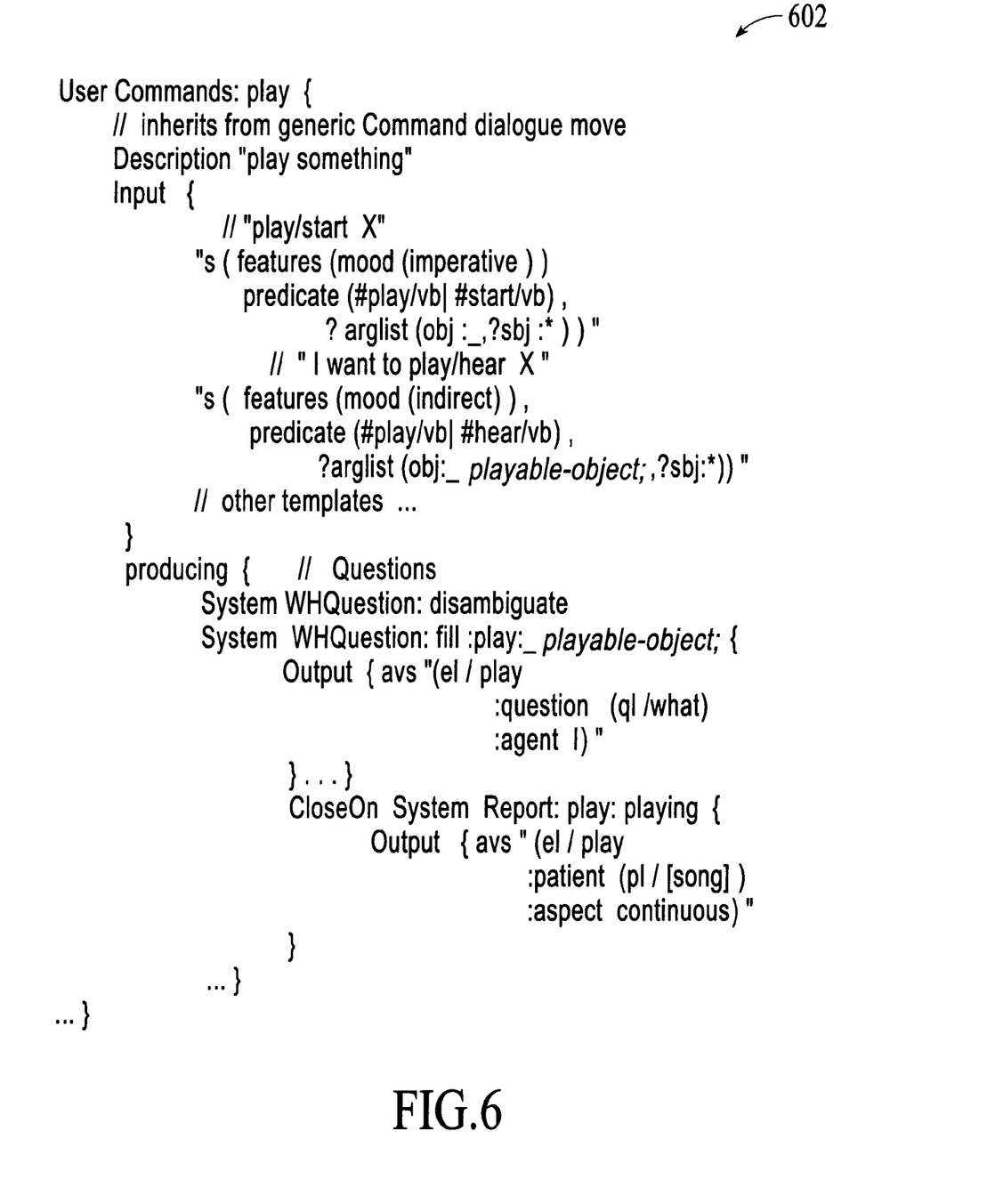
FIG. 6 is a sample DMS for a "play" Command for an MP3 device, under an embodiment.

FIG. 6 is a sample Dialogue Move Script ("DMS") 602 for a "play" Command for an MP3 device, under an embodiment. Variables in the DMS 602 correspond to variables in the AM for the corresponding device. In particular, the AM for the MP3 device contains a "play" operation with a corresponding (required) "_playable-object" argument. When an incoming semantic form matches an "Input" template in this DMS 602, the unification operation fills the "_playable-object" variable, which resolves to an object from the device's domain of objects (further described below) and fills the corresponding slot in the activity constructed from the device AM. Further details on the properties of the dialogue move scripting language follow. While this sample DMS 602 is for a particular command used with a particular type of device, the embodiments described herein are not limited to this command or this device.

The dialogue move scripting language of an embodiment allows hierarchical specification and refinement of dialogue moves. The sample DMS 602 corresponds to a "play" command, and inherits from a more generic "Command" dialogue move. The "Command" dialogue move is implemented in Java for example, where the corresponding DMS has a field that names the Java class that implements the dialogue move. The "play" command move is implemented by the same generic code, but specifies its own patterns for triggering the move, and defines attachment patterns and appropriate generation messages. In general, the depth of inheritance is unbounded (e.g. a sub-move of the "play" command move may be defined that is applicable in very specific contexts).

One type of move for which the inheritance of the DMS is particularly useful is information-query moves across devices. Questions about music in an MP3 database or restaurants in a city information guide are often structurally similar, i.e. query-construction itself is (relatively) domain-independent. Each type of query can be handled by a different dialogue move (corresponding to different devices or knowledge sources), but each set of "Inputs" can be inherited from a single "Query" dialogue move.

Other operations that can be applied at abstract levels of dialogue move include "rewrite rules" that are used to transform input forms before they are matched against dialogue move "Input" templates, e.g., transforming indirect commands into direct imperatives, or replacing a temporal marker (e.g. "now") with an appropriate semantic feature. Rewrite rules are domain/device-independent and are applied to the input before any specific device or dialogue move is selected.

The DMS of an embodiment also supports selection of dialogue moves via semantic templates. The "Input" section of a DMS includes the list of input items that would trigger this particular dialogue move. These templates are matched against the output of the parser (in the case of the example DMS 602, a statistical parser trained on a corpus collected from Wizard of Oz experiments of users interacting with an MP3 player (see Cheng, H., H. Bratt, R. Mishra, E. Shriberg, S. Upson, J. Chen, F. Weng, S. Peters, L. Cavedon, J. Niekrasz, 2004, "A Wizard of Oz framework for collecting spoken human-computer dialogs", INTERSPEECH: $8^{th}$ International Conference on Spoken Language Processing, Jeju Island, Korea)). Parsed forms may be normalized or processed in any way (e.g., using an ontology, or via rewrite rules) before being matched against "Input" templates. "Input" templates can be attached to domain-specific dialogue moves or to generic moves (and inherited).

The specific formalism of the "Input" templates in the example DMS 602 illustrates a specific instance matching the output of a specific statistical parser; a different parser output formalism would use a different formalism, but in general, the templates can be viewed as feature structures, and the matching operation is effectively one-way unification. The symbols of an embodiment are interpreted as follows, but may not be so limited: "#" represents a lexical item, with a part-of-speech tag following the "/" symbol; "|" represents alternatives; "?" represents an optional argument; "_" represents a variable matching one from the Activity Model; and "*" represents a match with anything. Hence, the dialogue move in the example DMS 602 matches "play X", "start X", or an indirect command involving "play X" or "hear X" (for convenience, indirect commands have their embedded sentence extracted using a generic rewrite rule); the object to be played is marked as optional (i.e., the template matches even when this argument is missing).

The RNDS DM 100 is representation neutral in that the form of the templates and the corresponding matching algorithm can be replaced without affecting the RNDS DM infrastructure. This enables easy replacement of the parser or NLG component to ones using different representations. For example, a more standard feature-structure representation and feature-unification algorithm could be substituted with no other changes required to the RNDS DM code.

When an input form matches an entry in a dialogue move's "Input" section, this may cause variables to be bound; in particular, a variable may be bound that corresponds to one from the AM. For example, if an input matching the example DMS 602 includes a well-formed "arg" argument, then this supplies a value for "_playable-object"; if no "arg" is present, then this variable is left unfilled (in which case the "Command" dialogue move may generate a request for information).

In general, multiple matches are possible, since there are generally multiple scripted dialogue moves and multiple entries in each move's "Input" section. The RNDS DM 100 of an embodiment scores each possible match using generic criteria (e.g. applicability to current context; minimizing unresolved information). However, alternative embodiments may include probabilistic approaches to incorporating evidence from multiple criteria to select appropriate dialogue moves, including prosodic information and shallow topic-categorization.

The dialogue scripting language of an embodiment provides a mechanism for specifying attachment rules. These attachment rules determine the types of dialogue moves that can attach to existing active nodes in the DMT. For example, the example DMS 602 shows that (among others) a disambiguating "WhQuesion" or a "WhQuestion" for filling a missing argument can attach to a "Command" node (such attachment rules are often specified at more abstract levels, not at the level of specific commands). Dialogue move information can be scripted "in place" inside one of these specifications (as done for the "WhQuestion:fill:play" move).

The DMS also encodes which adjacent moves close a dialogue move (i.e. inactivate it so no other move can attach to it), in the "CloseOn" field. Closing a node for attachment effectively closes the corresponding thread of conversation (revisions may reopen a "Command" or "Query" node). Nodes are also automatically closed after a specified period.

Much of the RNDS output is automatically generated, e.g. encoded in general-purpose dialogue moves. However, applications may call for domain- and device-specific outputs. These domain- and device-specific outputs can also be encoded in the DMS 102 of an embodiment; since these outputs will be system responses, these are encoded inside "System" dialogue moves. The DMS 102 permits any representation of these specific outputs, so long as the representation matches the representation used by the specific NLG system 210 with which the RNDS DM 100 interfaces for the given application. In this manner the RNDS DM 100 is representation-neutral because use of a different NLG component (using a different representation) in the dialogue system results only in modification of the DMS 102, and requires no modification to the core of the RNDS DM 100.

The RNDS 200 therefore provides a combination of powerful practical core dialogue management processes with easy scriptable definitions of domain-specific information, such as dialogue-moves and NP-resolution mappings. The RNDS 200 is thus customizable to new domains and applications, and also provides the means for plug-and-play multi-device dialogue management as described above. This plug-and-play capability is an important feature of systems that can have their functionality extended without going off-line. Plug-and-play typically involves adding new components that provide enhanced functionality to the RNDS 200 without disrupting the existing framework. The RNDS 200 of an embodiment implements the plug-and-play environment through the use of a specification language by which components advertise their capabilities, as well as encapsulation of the implementation of the component.

The plug-and-play multi-device dialogue management supports the addition of new devices to the RNDS 200 that function with the RNDS DM 100 without having to load new software or otherwise modify the RNDS DM 100. The new device, when plugged in to the RNDS 200, broadcasts information of its interface to the RNDS DM 100. For example, the new device may provide the RNDS DM 100 with information of the functions it performs (activity model), the language(s) it handles (types of things device understands from user), any device-specific DMS 232, any device-specific NPRS 234 (if descriptions of objects pertinent to the device are present in the system then the device tells the RNDS DM 100 how to translate the objects into queries for the device's KB), and device-specific core Java code.

Referring to FIG. 2, new devices that register with the RNDS DM 100 encapsulate all information required for use by the RNDS DM 100 in managing dialogue with these new devices. This encapsulated information includes four components in an embodiment, where the four components include the DMS 232, as described above, the AM 230 describing any device functionality accessible by the dialogue, device-specific ontology and/or knowledge base, and rules for device-specific NP-resolution 234. The encapsulated information of alternative embodiments may include additional or different information as appropriate to the device and the RNDS DM 100.

Device-specific implementations of dialogue management processes can also be added, or used to overwrite generic implementations, by including new Java classes in the encapsulated information as appropriate to the device. For example, a dialogue-move that handles a new form of interaction introduced by a new device could be added. In general, however, the four components that make up the encapsulated information include all device-specific information used by the RNDS DM 100 for dialogue with the device, and allow for dynamic plug-and-play of dialogue-enabled devices.

In providing multi-device dialogue management, the RNDS DM 100 of an embodiment extends the DMT infrastructure so as to allow new devices to be dynamically added or plugged in to the RNDS 200. Once added, the new dialogue-enabled devices register themselves with the RNDS DM 100, and nodes in the DMT 108 are associated with specific devices where appropriate. Also, "current device" becomes part of the information-state and interpreting incoming utterances is performed in this context.

The RNDS DM 100 also performs device selection (i.e., determining with which device an utterance is associated) as a component process of multi-device dialogue management. The device selection decision process of the RNDS DM 100 involves lexical and semantic information, dialogue move classification, and discourse structure, as well as bias towards the "current device". The decision process also uses a strategy that relates NPs to the appropriate device ontology (e.g. reference to a "song" will match a category in the ontology associated with an MP3 device, but potentially with no other devices). This strategy however does not necessarily resolve all device-ambiguities; for example an address-book may be used by both a phone-device ("get John on the phone") as well as a navigation service ("how do I get to John's house?").

Consequently, the RNDS DM 100 relates the processes of device-selection and NP-resolution as co-dependent processes because information about the resolution of NPs provides important clues about the device being referred to, but NP-resolution may actually be quite device-specific, as described below. The RNDS DM 100 thus performs a shallow NP analysis (e.g. matching nouns and proper names against ontology categories and KB items associated with a specific device) in order to identify a device, and then uses the device-specific NP-resolution rules described below to fully resolve the NPs. Alternative embodiments however may use other features (e.g., shallow topic-categorization techniques) and/or probabilistic methods for this classification task.

Much of the NP-resolution process can be seen as fairly domain-independent (e.g. anaphora resolution). However, aspects of NP-resolution are both domain- and device-dependent. For example, the phrase "What's this" is interpreted differently in the context of music playing over an MP3 player than when using a touch-screen multimodal interface. The RNDS DM 100 addresses this in a manner analogous to the DMS 102 for customizing dialogue moves by custom-adapting the core NP-resolution capabilities implemented in the RNDS DM 100 for a specific domain/device via the NP-resolution scripting language and the NPRS 104. The NPRS 104 is effectively context-free grammars that allow the user to define how NP objects are mapped to knowledge-base queries for a specific device, in the context of the current dialogue information state and input semantic form. In particular, for the MP3 device, "this" in the context of "What's this" would be mapped to a query that returns the name of the currently playing song for example.

Figure 7:
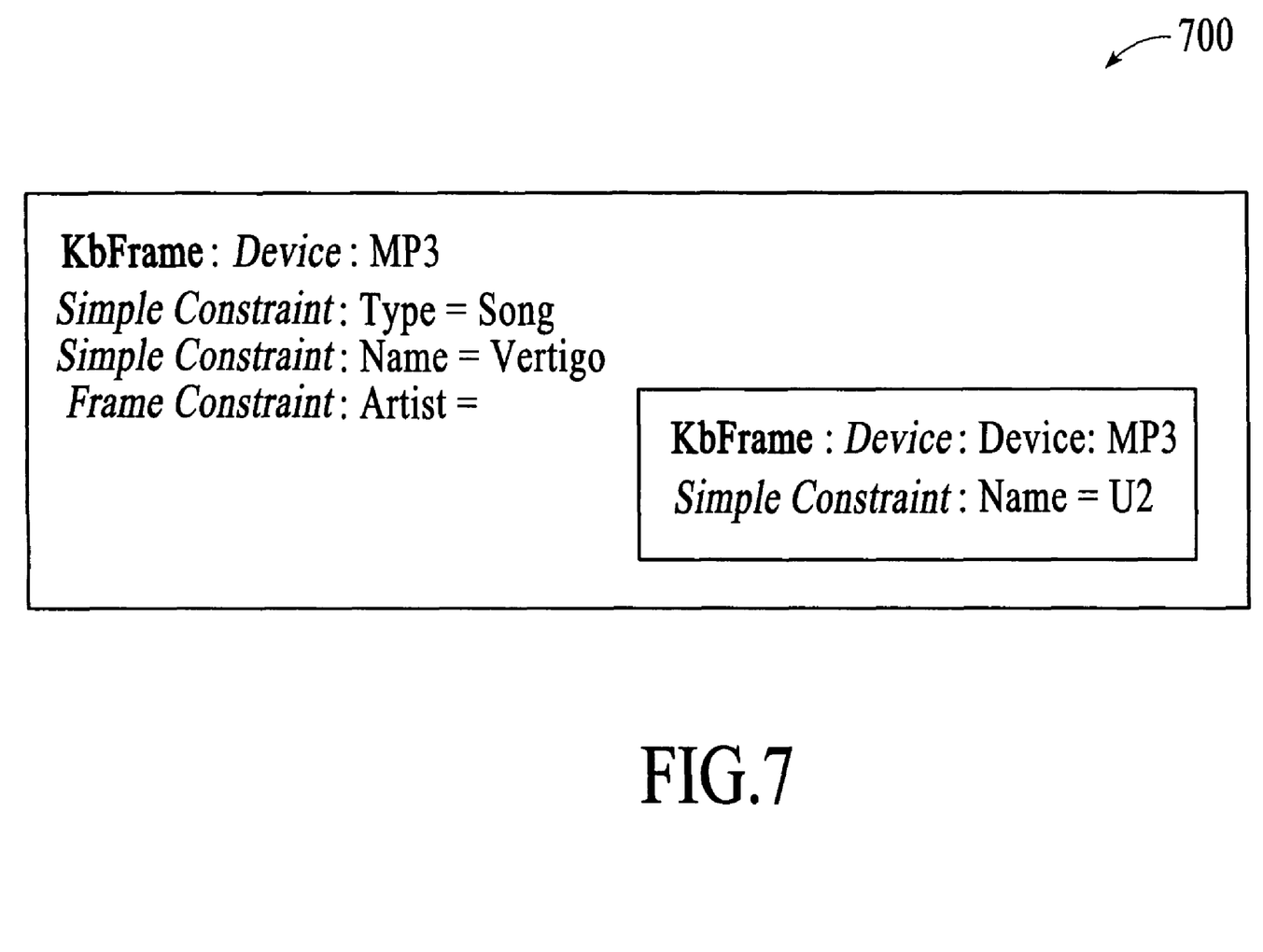
FIG. 7 is a sample noun phrase-query ("NP-query") object for "the song Vertigo by U2", under an embodiment.

The RNDS DM 100 uses the NPRSs 104 to translate NPs into Java objects implementing constraint-based KB-queries (referred to herein as a "noun phrase-query" or "NP-query"). FIG. 7 is a sample noun phrase-query ("NP-query") object 700 for "the song Vertigo by U2", under an embodiment. Rules of the RNDS DM 100 specify how to translate NPs specified in the input semantic form into such objects. The RNDS DM 100 includes a number of generic constraint objects and associated transformants, but further objects may be included as part of the device encapsulation to provide any novel processing specific to that device. For example, an MP3 device will need to handle qualifiers such as "by artist", and know to translate this construct into an appropriate constraint on the "artist" field of the KB.

The way in which information is extracted from an NP representation depends, of course, on the specific format of the input as well as the structure of the KB associated with a device. The RNDS DM 100 uses a rule-based language for specifying how an NP (regardless of format) maps to constraint-based query objects, making use of generic or device-specific frame-construction operations. Such rules are used for handling synonyms (i.e. by mapping multiple nouns into the same query-type) as well as specifying the construction of complex query objects from complex NPs.

Figure 8:
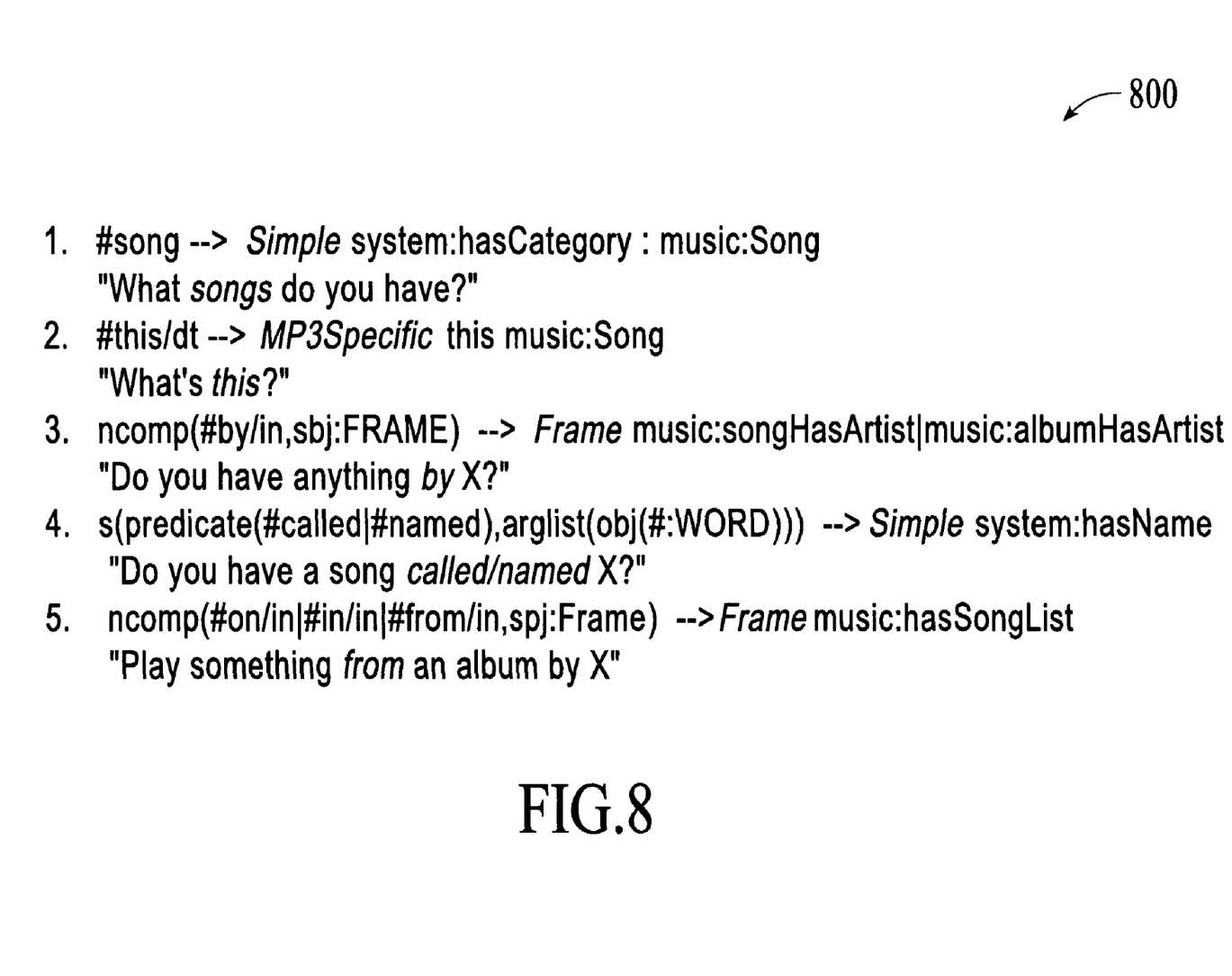
FIG. 8 is an example of noun phrase-resolution rules, under an embodiment.

FIG. 8 is an example of noun phrase-resolution ("NP-resolution") rules 800, under an embodiment. These NP-resolution rules 800 are taken from the NP-resolution script for an MP3 device, but are not so limited. The left-hand side of each rule matches a construct from the output of the statistical parser used in this particular application: the symbol "#" indicates that the corresponding word has been marked as a head word; the token following "/" is the part-of-speech ("POS") of the matched item; and entries in upper-case designate variables. The right-hand side of each rule specifies how to construct a query or constraint for the KB: the first item signifies what type of constraint this is (which determines which construction process to use); the remaining portion of the right-hand side specifies the specific KB fields to test.

Referring to the NP-resolution rules 800, (1) constructs a simple query for objects of type "Song"; (2) utilizes an MP3-specific constraint-construction processes to match a "Song" labeled as "this" (which is mapped to the currently playing song); (3) maps a "by X" complement onto a constraint on "Artist" (for either a song or an album), where the "FRAME" variable indicates that the embedded NP may be complex and should itself be analyzed; (4) handles an embedded sentence of the form "named X"; and (5) handles other complements that may qualify a query for a song. Rules may be recursive in that the output of one rule application may be the input to another rule.

The NP-resolution rule constructions of an embodiment, while not dependent on the particular syntax or format of the rules, can be easily specified for a given new device and encapsulated with the device. As with the DMS 102, generic constructs can be inherited or overwritten in a device-specific script, while device-specific NP-interpretation rules can be encapsulated with the given device.

The RNDS 200 described herein provides management of multi-device conversations, dialogue-move scripting that facilitates greater portability to new domains and also enables multi-device dialogue, and scripting functionality to extend other core dialogue processes (such as NP-resolution) so as to cover domain-specific phenomena. Data-structures and processes internal to the RNDS 200 are also enhanced to handle switching conversation between different devices. These features are packaged so as to facilitate a programming API that enables dynamic "plug-and-play" of new devices into the RNDS DM 100.

The RNDS of an embodiment includes a method comprising at least one of receiving an input pattern generated from an acoustic signal that includes a description of a dialogue contribution from a speaker, identifying the description and at least one parameter of the description using a dialogue move script (DMS), wherein the DMS corresponds to at least one of a device and an application, and mapping the description to a dialogue move using the DMS, the dialogue move corresponding to the identified parameter and independent of the device and application.

The method of an embodiment further comprises adapting the dialogue move for use across at least one of a plurality of different domains and a plurality of different applications via reprogramming of the DMS.

The method of an embodiment further comprises at least one of identifying at least one of the device and application to which the description corresponds using a noun phrase of the description, selecting a noun phrase-resolution script (NPRS) that corresponds to at least one of the identified device and application and accessing noun phrase-resolution rules via the selected NPRS, and translating the description and generating a query that corresponds to at least one of the device and the description using the noun phrase-resolution rules.

The method of an embodiment further comprises retrieving at least one object referenced by object descriptions from the dialogue contribution from at least one database in response to the query. The object descriptions of an embodiment include noun-phrases.

The method of an embodiment further comprises adapting at least one of the noun phrase-resolution rules for use across at least one of a plurality of different domains and a plurality of different applications via reprogramming of the NPRS.

The NPRS of an embodiment includes KnowedgeBase-query construction rules that are programmable to define how noun phrase objects are mapped to the query for each of a plurality of devices.

Generating the query of an embodiment includes translating a noun phrase of the description into the object.

The description of an embodiment is a structured language-based description that includes at least one of a semantic description, a syntactic description, phonological information, utterance-level information, and topic-classification of the dialogue contribution.

The mapping of an embodiment further comprises recognizing at least one parameter of the dialogue contribution.

The method of an embodiment further comprises scoring matches between variables of the description and the dialogue move components.

The RNDS of an embodiment includes a system comprising at least one of: a dialogue manager based on the information-state-update approach that includes a plurality of dialogue moves and a dialogue move script (DMS) that corresponds to at least one of a device and an application, the dialogue manager receiving an input pattern generated from an acoustic signal that includes a description of a dialogue contribution from a speaker, the DMS recognizing the description and at least one parameter of the description, the DMS mapping the description to a one of the dialogue moves that corresponds to the recognized parameter; a knowledge manager coupled to the dialogue manager and to at least one database; and a device manager coupled to the dialogue manager.

The plurality of dialogue moves of an embodiment is adapted for use across at least one different domain and application via reprogramming of the DMS.

The dialogue manager of an embodiment further comprises a noun phrase resolver coupled to a plurality of noun phrase-resolution scripts (NPRSs) and a plurality of rules, wherein each NPRS corresponds to at least one of the device and the application.

The noun phrase resolver of an embodiment uses the NPRS to access the rules and translate the recognized description in order to generate a query that corresponds to at least one of the device and application.

The rules of an embodiment are adapted for use across at least one different domain and application via reprogramming of the NPRS.

The NPRS of an embodiment includes KnowledgeBase-query construction rules that are programmable to define how noun phrase objects are mapped to the query for each of the devices.

The system of an embodiment further comprises at least one database, wherein the knowledge manager transfers the query to the database. In response to the query the dialogue manager of an embodiment receives at least one object of the dialogue contribution from the database.

The system of an embodiment further comprises a plurality of devices, wherein each device is coupled to the device manager through a description of each device conforming to a device application programming interface (API), wherein each device description includes at least one of an activity model, a device-specific DMS, a device-specific NPRS, and code implementing further device-specific functionality. The code of an embodiment implementing further device-specific functionality includes device-specific dialogue moves. The activity model of an embodiment includes variables that correspond to DMS variables.

In response to coupling of the device to the device manager the dialogue manager of an embodiment receives and stores information of the activity model, device-specific DMS, device-specific NPRS, and device-specific dialogue moves from the device API.

The system of an embodiment further comprises at least one of a speech recognition module and a language understanding module coupled to an input of the dialogue manager.

The system of an embodiment further comprises at least one of a language generation module and a text-to-speech module coupled to an output of the dialogue manager.

The RNDS of an embodiment includes a dialogue-enabling device including at least one of means for receiving an input pattern generated from an acoustic signal that includes a description of a dialogue contribution from a speaker, means for identifying the description and at least one parameter of the description using a dialogue move script (DMS), wherein the DMS corresponds to at least one of a device and an application, and means for mapping the description to a dialogue move using the DMS, the dialogue move corresponding to the identified parameter and independent of the device and application.

The RNDS of an embodiment comprises computer-readable medium including executable instructions, which when executed in a processing system, manage dialogue by receiving an input pattern generated from an acoustic signal that includes a description of a dialogue contribution from a speaker, identifying the description and at least one parameter of the description using a dialogue move script (DMS), wherein the DMS corresponds to at least one of a device and an application, and mapping the description to a dialogue move using the DMS, the dialogue move corresponding to the identified parameter and independent of the device and application.

The RNDS of an embodiment includes a method comprising at least one of providing a plurality of generic dialogue scripts in a dialogue management system based on an information-state-update approach, wherein the dialogue scripts each include extensions to routines, wherein the extensions provide functionalities that are specific to at least one of domains, devices, and applications, receiving an input into the dialogue management system, the input including a description of a dialogue contribution, and mapping the received input to at least one of a plurality of core components using at least one of the generic dialogue scripts, wherein the core components include dialogue management components that are independent of at least one of domains, devices, and applications.

The generic dialogue scripts of an embodiment include dialogue move scripts (DMS) and noun phrase-resolution scripts (NPRS).

The method of an embodiment further comprises receiving additional ones of the generic dialogue scripts, wherein the additional ones extend at least one of the domains, device, and applications that interact with the dialogue management system. The additional ones of an embodiment are received from at least one of new devices and new applications that couple to the dialogue management system.

Aspects of the RNDS described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the RNDS include: microcontrollers with memory (such as electronically erasable programmable read only memory (EEPROM)), embedded microprocessors, firmware, software, etc. Furthermore, aspects of the RNDS may be embodied in microprocessors having software-based circuit emulation, discrete logic (sequential and combinatorial), custom devices, flizzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various components disclosed herein may be described and expressed (or represented) as data and/or instructions embodied in various computer-readable media. Computer-readable media in which such data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by aprocessing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the RNDS is not intended to be exhaustive or to limit the RNDS to the precise form disclosed. While specific embodiments of, and examples for, the RNDS are described herein for illustrative purposes, various equivalent modifications are possible within the scope of the RNDS, as those skilled in the relevant art will recognize. The teachings of the RNDS provided herein can be applied to other processing systems and methods, not only for the systems and methods described above.

The elements and acts of the various embodiments described above can be combined to provide further embodiments. These and other changes can be made to the RNDS in light of the above detailed description.

In general, in the following claims, the terms used should not be construed to limit the RNDS to the specific embodiments disclosed in the specification and the claims, but should be construed to include all processing systems that operate under the claims. Accordingly, the RNDS is not limited by the disclosure, but instead the scope of the RNDS is to be determined entirely by the claims.

While certain aspects of the RNDS are presented below in certain claim forms, the inventors contemplate the various aspects of the RNDS in any number of claim forms. For example, while only one aspect of the RNDS is recited as embodied in machine-readable medium, other aspects may likewise be embodied in machine-readable medium. Accordingly, the inventors reserve the right to add additional claims after filing the application to pursue such additional claim forms for other aspects of the RNDS.

What is claimed is:

1. A method comprising:
receiving an input pattern to a dialogue system generated from an acoustic signal that includes a description of a dialogue contribution from a speaker, the dialogue contribution comprising part of an activity oriented dialog concerning activities carried out by the speaker and at least one current device;
managing the activities in an activity tree (AT), each of the activities being initiated by a command included in the dialogue contribution from the speaker;
defining an activity model (AM) for each device of the at least one device, the activity model comprising scripts encapsulating device-specific information and constituting a declarative specification of device capabilities and their relationships to linguistic information involved in the dialogue contribution;
identifying the description and at least one parameter of the description using a dialogue move script (DMS), wherein the DMS corresponds to the at least one device;
mapping the description to a dialogue move using the DMS, the dialogue move corresponding to the identified parameter and independent of the device and using the DMS to translate the command into a query to retrieve an object of the command;
adding a new dialogue-capable device the dialogue system including associating a device-specific DMS with the new dialogue-capable device that includes mappings to device-specific dialogue moves;
receiving a broadcast of an interface from the new dialogue-capable device, wherein the broadcast comprises information including functionality of the new dialogue-capable device, languages recognized by the new dialogue-capable device, and any device-specific DMS required for the new dialogue-capable device, to allow the new dialogue-capable device to self-register with a dialogue manager component of the dialogue system; and
defining the new dialogue-capable device to be a current device within an information state of the dialogue system after receipt of the broadcast.

2. The method of claim 1, further comprising:
adding dialogue-capability for existing devices to the dialogue system including associating a device-specific DMS with each device that includes mappings to device-specific dialogue moves; and
adapting the dialogue move for use across at least one of a plurality of different domains and a plurality of different applications via reprogramming of the DMS to allow the added new dialogue-capable device to use at least some of the same code components as existing dialogue-capable devices.

3. The method of claim 2 wherein the DMS comprises part of a dialogue scripting language that defines hierarchical definitions of dialogue moves and allows inheritance and re-use of existing dialogue moves among the added new dialogue-capable device and the existing dialogue-capable devices.

4. The method of claim 3 wherein the dialogue scripting language allows customization of dialogue moves from an initial domain to a second domain.

5. The method of claim 3 wherein the added new dialogue-capable device includes encapsulated information including the DMS, the AM describing any device functionality accessible by the activity oriented dialogue, a device-specific ontology, and one or more rules for device-specific noun-phrase resolution for noun phrases within the activity oriented dialogue.

6. The method of claim 1, further comprising:
identifying at least one of the current device and application to which the description corresponds using a noun phrase of the description;
selecting a noun phrase-resolution script (NPRS) that corresponds to at least one of the identified current device and application and accessing noun phrase-resolution rules via the selected NPRS; and translating the description to generate the query that corresponds to at least one of the device and the description using the noun phrase-resolution rules.

7. The method of claim 6, further comprising retrieving at least one object referenced by object descriptions from the dialogue contribution from at least one database in response to the query.

8. The method of claim 7, wherein the object descriptions include noun-phrases.

9. The method of claim 6, further comprising adapting at least one of the noun phrase-resolution rules for use across at least one of a plurality of different domains and a plurality of different applications via reprogramming of the NPRS.

10. The method of claim 6, wherein the NPRS includes query construction rules that are programmable to define how noun phrase objects are mapped to the query for each of a plurality of devices.

11. The method of claim 6, wherein generating the query includes translating a noun phrase of the description into the object.

12. The method of claim 1, wherein the description is a structured language-based description that includes at least one of a semantic description, a syntactic description, phonological information, utterance-level information, and topic-classification of the dialogue contribution.

13. The method of claim 1, wherein the mapping further comprises recognizing at least one parameter of the dialogue contribution.

14. The method of claim 1, further comprising scoring matches between variables of the description and the dialogue move components.

15. A dialogue manager system based on an information-state-update approach, the system comprising:
an input stage receiving an input pattern to a dialogue system generated from an acoustic signal that includes a description of a dialogue contribution from a speaker, the dialogue contribution comprising part of an activity oriented dialog concerning activities carried out by the speaker and at least one current device;
an activity tree (AT) managing the activities, wherein each of the activities is initiated by a command included in the dialogue contribution from the speaker;
an activity model (AM) for each device of the at least one device, the activity model comprising scripts encapsulating device-specific information and constituting a declarative specification of device capabilities and their relationships to linguistic information involved in the dialogue contribution;
a plurality of dialogue moves and a dialogue move script (DMS) that corresponds to the at least one device, the dialogue manager receiving an input pattern generated from an acoustic signal that includes a description of a dialogue contribution from the speaker, the DMS recognizing the description and at least one parameter of the description, the DMS mapping the description to a one of the dialogue moves that corresponds to the recognized parameter, wherein the dialogue manager further operates to use a device-specific DMS that includes mappings to device-specific dialogue moves as part of adding one of new dialogue-capable devices and dialogue-capability for existing devices to the system;
a knowledge manager coupled to the dialogue manager and to at least one database; and
a device manager coupled to the dialogue manager, and configured to receive a broadcast of an interface from the new dialogue-capable device when the new dialogue-capable device is added to the dialogue manager system and further configured to associate a device-specific DMS with the new dialogue-capable device that includes mappings to device-specific dialogue moves, wherein the broadcast comprises information including functionality of the new dialogue-capable device, languages recognized by the new dialogue-capable device, and any device-specific DMS required for the new dialogue-capable device, to allow the new dialogue-capable device to self-register with a dialogue manager component of the dialogue system, and further wherein the new dialogue-capable device is defined to be a current device within an information state of the dialogue system after receipt of the broadcast.

16. The system of claim 15, wherein at least one of the plurality of dialogue moves is adapted for use across at least one different domain and application via reprogramming of the DMS.

17. The system of claim 15, wherein the dialogue manager further comprises a noun phrase resolver coupled to a plurality of noun phrase-resolution scripts (NPRSs) and a plurality of rules, wherein each NPRS corresponds to at least one of the current device and the application.

18. The system of claim 17, wherein the noun phrase resolver uses the NPRS to access the rules and translate the recognized description in order to generate a query that corresponds to at least one of the current device and application.

19. The system of claim 17, wherein the rules are adapted for use across at least one different domain and application via reprogramming of the NPRS.

20. The system of claim 17, wherein the NPRS includes query construction rules that are programmable to define how noun phrase objects are mapped to the query for each of the current device.

21. The system of claim 17, wherein the knowledge manager transfers the query to the database.

22. The system of claim 21, wherein in response to the query the dialogue manager receives at least one object of the dialogue contribution from the database.

23. The system of claim 15, further comprising a plurality of devices including the current device, wherein each device is coupled to the device manager through a description of each device conforming to a device application programming interface (API), wherein each device description includes at least one of an activity model, a device-specific DMS, a device-specific NPRS, and code implementing further device-specific functionality.

24. The system of claim 23, wherein the code implementing further device-specific functionality includes device-specific dialogue moves.

25. The system of claim 23, wherein the activity model includes variables that correspond to DMS variables.

26. The system of claim 15, wherein in response to coupling of the current device to the device manager the dialogue manager receives and stores information of the activity model, device-specific DMS, device-specific NPRS, and device-specific dialogue moves from the device API.

27. The system of claim 15, further comprising at least one of a speech recognition module and a language understanding module coupled to an input of the dialogue manager.

28. The system of claim 15, further comprising at least one of a language generation module and a text-to-speech module coupled to an output of the dialogue manager.

* * * * *